D. F. TAFT.
Methods of Applying Nut-Locks.

No. 156,108.　　　　　　　　　　　　　Patented Oct. 20, 1874.

WITNESSES
Robert Everett.
Geo. E. Upham.

By

INVENTOR
Daniel F. Taft
Chipman Hosmer & Co
ATTORNEYS.

UNITED STATES PATENT OFFICE.

DANIEL F. TAFT, OF NEW BEDFORD, MASSACHUSETTS.

IMPROVEMENT IN METHODS OF APPLYING NUT-LOCKS.

Specification forming part of Letters Patent No. 156,108, dated October 20, 1874; application filed March 7, 1873.

*To all whom it may concern:*

Be it known that I, DANIEL F. TAFT, of New Bedford, in the county of Bristol and State of Massachusetts, have invented a new and valuable Improvement in Nut-Locks; and I do hereby declare that the following is a full, clear, and exact description of the construction and operation of the same, reference being had to the annexed drawings making a part of this specification, and to the letters and figures of reference marked thereon.

Figure 1:
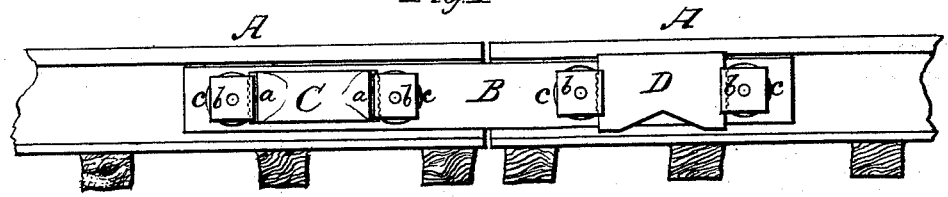
Figure 2:
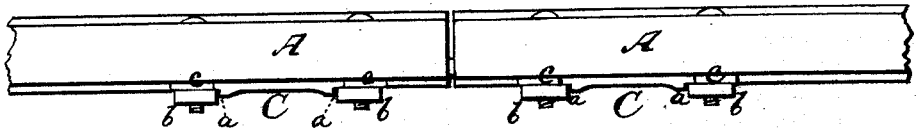
Figure 3:
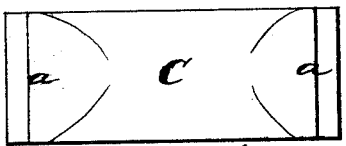
Figure 4:
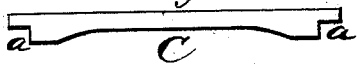
Figure 5:
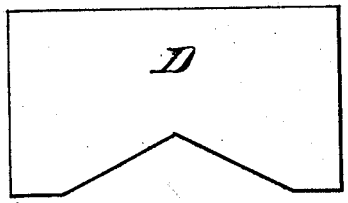
Figure 6:
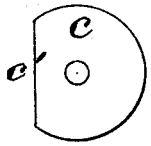

Figure 1 of the drawing is a representation of a side elevation of my nut-lock. Fig. 2 is a top view of the same. Figs. 3, 4, 5, and 6 are detail views.

This invention has relation to devices for locking-nuts on bolts which are used for the splices or fish-plates of railroad-rails; and it consists in combining with flat-sided washers a flat steady plate for keeping the washers in proper positions while screwing up the nuts to receive the locking-plates, as will be hereinafter explained.

In the annexed drawings, A A designate the ends of two rail-sections, and B is a fish-plate for splicing these sections. C designates a rectangular locking-plate, which is constructed with shoulders $a$ $a$ near its ends, which shoulders are perpendicular to the longest edges of their plate. After slipping on the washers $c$ and applying the nuts, a flat plate, D, is adjusted between the flattened edges $c'$ of the washers, which plate will prevent the washers from being turned while screwing up the nuts $b$. After the nuts are screwed up tight the plate D is removed by prying it up with a lever, which will leave the flat sides $c'$ of the washers $c$ perpendicular to the base of the rail. The locking-plate C is then inserted between the washers, as shown in Figs. 1 and 2, so that its shoulders will abut against the edges of the nuts and prevent them from turning or working loose.

What I claim as new, and desire to secure by Letters Patent, is—

The combination of the washers $c$ $c$, having a straight side, as shown, with the removable plate D, for retaining the washers, while applying the nuts, in proper position to receive the shouldered locking-plate C, substantially as set forth.

In testimony that I claim the above I have hereunto subscribed my name in the presence of two witnesses.

DANIEL F. TAFT.

Witnesses:
   THOMAS J. TAFT,
   GEORGE F. POTTER.